(12) United States Patent
Bidnyk et al.

(10) Patent No.: US 7,474,824 B2
(45) Date of Patent: Jan. 6, 2009

(54) PLANAR LIGHTWAVE FILTER WITH MIXED DIFFRACTION ELEMENTS

(75) Inventors: Serge Bidnyk, Ottawa (CA); Ashok Balakrishnan, Ottawa (CA); Matt Pearson, Ashton (CA)

(73) Assignee: Enablence Inc., Kanata, Ontario (CA)

( * ) Notice: Subject to any disclaimer, the term of this patent is extended or adjusted under 35 U.S.C. 154(b) by 0 days.

(21) Appl. No.: 11/690,314

(22) Filed: Mar. 23, 2007

(65) Prior Publication Data
US 2007/0230871 A1 Oct. 4, 2007

Related U.S. Application Data

(60) Provisional application No. 60/787,700, filed on Mar. 31, 2006.

(51) Int. Cl.
*G02B 6/34* (2006.01)
(52) U.S. Cl. .......................... 385/37; 385/46
(58) Field of Classification Search ................ 385/31, 385/37, 46, 47, 50, 129–132
See application file for complete search history.

(56) References Cited

U.S. PATENT DOCUMENTS

| | | | |
|---|---|---|---|
| 6,493,121 B1 | 12/2002 | Althaus | 398/135 |
| 6,694,102 B2 | 2/2004 | Baumann et al. | 398/138 |
| 6,731,882 B1 | 5/2004 | Althaus et al. | 398/139 |
| 6,757,460 B2 | 6/2004 | Melchior et al. | 385/31 |
| 6,879,441 B1 | 4/2005 | Mossberg | 359/569 |
| 7,054,517 B2 * | 5/2006 | Mossberg et al. | 385/14 |
| 7,068,885 B2 | 6/2006 | Bidnyk et al. | 385/37 |
| 7,151,635 B2 | 12/2006 | Bidnyk et al. | 359/572 |
| 2004/0047561 A1 | 3/2004 | Tuda | 385/39 |
| 2004/0131360 A1 | 7/2004 | Iazikov et al. | 398/83 |

* cited by examiner

*Primary Examiner*—Sarah Song
(74) *Attorney, Agent, or Firm*—Teitelbaum & MacLean; Neil Teitelbaum; Doug MacLean

(57) ABSTRACT

A planar lightwave circuit including a slab waveguide, with a plurality of different diffraction filtering elements optically coupling a plurality of input and output ports, provides various optical functionalities including multiplexing, demultiplexing, diplexer and triplexer. In the basic configuration one or more output ports are optically coupled to an input port via grating filters etching in the cladding of the slab waveguide, and an additional port is optically coupled to the input port via a diffraction grating etched in an endwall of the slab waveguide. A triplexer platform can be provided by optically coupling photo-detectors to two output ports, which receive wavelength channels demultiplexed from an input signal by two cladding etched filters, and by optically coupling a laser to another input port, which launches an outgoing laser signal at the endwall etched grating filter for coupling into the same fiber that launched the original input signal.

18 Claims, 10 Drawing Sheets

PLANAR LIGHTWAVE FILTER WITH MIXED DIFFRACTION ELEMENTS

CROSS-REFERENCE TO RELATED APPLICATIONS

The present invention claims priority from U.S. patent application Ser. No. 60/787,700 filed Mar. 31, 2006, which is incorporated herein by reference for all purposes.

TECHNICAL FIELD

The present invention relates to a planar lightwave filter circuit, and in particular to a planar lightwave filter circuit with mixed diffraction elements providing a combination of filtering elements with different characteristics in the same chip.

BACKGROUND OF THE INVENTION

Bidirectional multiplexers/demultiplexers, i.e. triplexers and diplexers, serve as optical gateways between a fiber to the home (FTTH) optical network and subscribers' homes. Triplexers and diplexers are extremely compact and low-cost access devices capable of receiving one (diplexer) or two (triplexer) high-speed channels (e.g. 1490 nm for telephone & internet, and 1550 nm for video), while simultaneously transmitting on a third channel (e.g. 1310 for information out). All these signals are multiplexed onto a single optical fiber for simple installation.

Typical triplexer requirements present considerable challenges for conventional optical component designers. Triplexer optical architecture requires that a laser, nominally 1310 nm in wavelength, is coupled to a single-mode fiber for transmitting optical signals from the subscriber's home. In the other direction on that same fiber, light at wavelengths of nominally 1490 nm and 1550 nm from outside the home are captured, demultiplexed and directed to optical detectors. Difficulties arise due to the operational passbands at the various wavelengths, i.e. at the 1310 nm channel, a band of 50 nm to 100 nm is expected, which provides a large margin within which the laser can operate essentially athermally, whereas bands of only 10 nm to 20 nm width are required for the detector channels. Furthermore, the laser diode operates in a single transverse mode, and the common input/output fiber is a single mode fiber; hence, the path followed by the laser channel must be at all points compatible with single-mode optics, i.e. the laser channel's path must be reversible. In conventional designs, especially those designs using a single diffractive structure in a planar lightwave circuit, there is no practical means of addressing a wide wavelength range (~1250 nm to 1600 nm) with channels having substantially different passbands.

Prior art devices, such as the triplexer 1 disclosed in U.S. Pat. No. 6,493,121 issued Dec. 10, 2002 to Althaus and illustrated in FIG. 1, achieve the functionality of the triplexer using a number of individually crafted thin film filters (TFF) 2a and 2b, placed in specific locations along a collimated beam path. The TFFs 2a and 2b are coupled with discrete lasers 3 and photo-detectors 4a and 4b, which are packaged in separate transistor-outline (TO) cans 6 and then individually assembled into one component. An incoming signal with the two incoming channels (1490 nm and 1550 nm) enter the triplexer 1 via an optical fiber 7. The first channel is demultiplexed by the first TFF 2a and directed to the first photo-detector 4a, and the second channel is demultiplexed by the second TFF 2b and directed to the second photo-detector 4b. The outgoing channel (1310 nm) is generated in the laser 3 and output the optical fiber 7 via the first and second TFFs 2a and 2b. Unfortunately, the assembly of such a device is extremely labor intensive requiring all of the elements to be aligned with very low tolerances.

Attempts to simplify the housing structure and thereby the assembly process are disclosed in U.S. Pat. No. 6,731,882 issued May 4, 2004 to Althaus et al, and U.S. Pat. No. 6,757,460 issued Jun. 29, 2004 to Melchior et al. Further advancements provided by a triplexer 5, illustrated in FIG. 2, involve mounting the TFFs 2a, 2b and 2c, the laser 3 and the photo-detectors 4a and 4b on a semiconductor microbench 9 ensuring repeatable and precise alignment. Unfortunately, all of these solutions still involve the alignment of TFFs with TO cans. An example of a prior art solution without TFFs is disclosed in U.S. Pat. No. 6,694,102 issued Feb. 17, 2004 to Baumann et al., which discloses a bi-directional multiplexer utilizing a plurality of Mach-Zehnder interferometers.

U.S. Pat. No. 7,068,885 issued Jun. 27, 2006 to the applicants of the present invention discloses a planar lightwave circuit including a pair of face to face diffraction gratings on opposite sides of a slab waveguide, which reflect optical signals off of each other in opposite directions providing diplexer and triplexer functionality.

Concave distributed Bragg reflectors, such as the ones disclosed in U.S. Pat. No. 6,879,441, issued Apr. 12, 2005 in the name of Mosberg, provide simple multiplexer/demultiplexer functionality; however, for the distributed Bragg reflectors, the spectral width of the reflected channel is proportional to the length of the Bragg reflector, e.g. 2 mm of Bragg reflector reflects 10 nm of bandwidth, therefore it would take 20 mm worth of Bragg reflector to reflect a band of 100 nm. Unfortunately, in applications such as diplexers and triplexers that require 100 nm of bandwidth to couple a laser diode channel, the cumulative size of the Bragg reflectors for all three channels would be too large for practical applications.

An object of the present invention is to overcome the shortcomings of the prior art by providing a planar lightwave filter circuit with mixed diffraction elements, whereby the advantages of the different types of diffraction filter elements can be exploited in a single planar lightwave filter circuit.

SUMMARY OF THE INVENTION

Accordingly, the present invention relates to a planar lightwave circuit device comprising:

a slab waveguide including a core region;

a first port for launching a first input optical signal into the slab waveguide;

a second port optically coupled with the first port for outputting at least a first portion of the input optical signal from the slab waveguide;

a third port optically coupled to the first port;

a first planar filter formed in the slab waveguide for redirecting the first portion of the input optical signal to the second port; and a concave reflective element having optical power formed in an end wall of the slab waveguide optically coupling the first port to the third port and enabling light to be focused therebetween.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
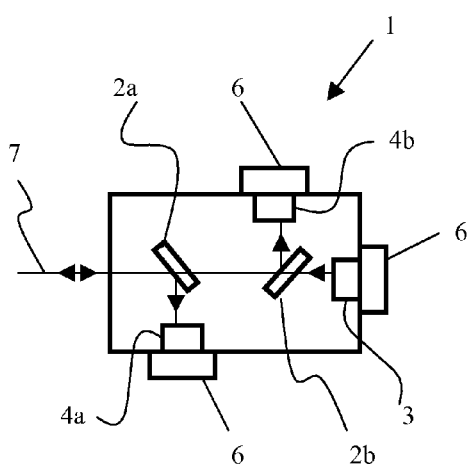
FIG. 1 illustrates a conventional triplexer device utilizing thin film filters.
Figure 2:
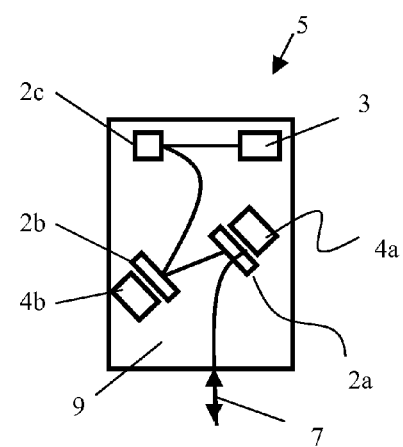
FIG. 2 illustrates a conventional triplexer device utilizing thin film filters mounted on a semiconductor substrate.
Figure 3:
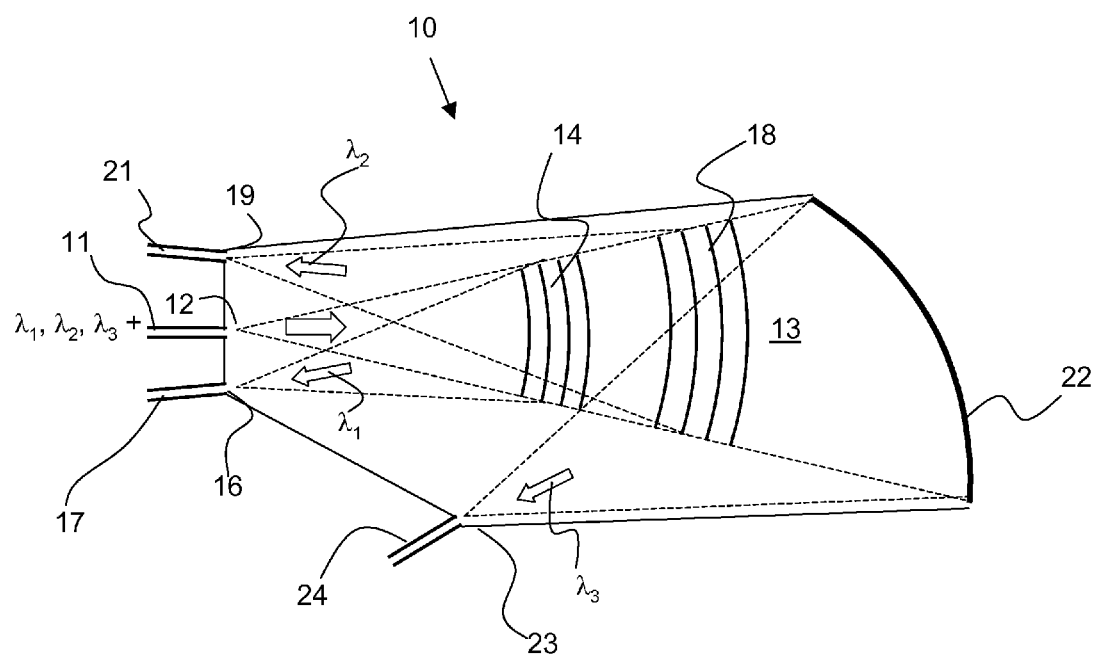
FIG. 3 illustrates a planar lightwave circuit according to the present invention for demultiplexing optical signals.

With reference to FIG. 3, the planar lightwave circuit 10 according to the present invention includes an input waveguide 11 optically coupled to an input port 12 through which an input optical signal with one or more wavelength channels, e.g. $\lambda_1$, $\lambda_2$ and $\lambda_3$+, enters into a two-dimensional slab waveguide 13. The slab waveguide 13 is defined by a waveguiding structure, which confines the light to predominantly two dimensions, while restricting the diffraction of the light in the third dimension. Typically, the slab waveguide 13 is comprised of upper and lower cladding regions or layers, with one or more core regions therebetween; however, in some embodiments, such as silicon-on-insulator (SOI), the upper cladding region may be air. Confined by the waveguiding structure, the input optical signal expands horizontally in the core region, i.e. diverges in the horizontal plane. Subsequently, the input optical signal encounters a first filter element 14, e.g. a first planar filter, such as a first distributed Bragg reflector. Most commonly, the Bragg reflectors 14 are either based on multi-core geometry, UV-light modified core regions or etched cladding layers. The first filter element 14 reflects a portion of the input optical signal, e.g. in a narrow wavelength range for demultiplexing a desired passband with one or more of the wavelength channels, e.g. centered at $\lambda_1$, or in a wide wavelength range for tapping off a small portion of each wavelength channel for monitoring purposes, forming a first reflected optical signal, while passing the remainder of the input optical signal, e.g. the remaining wavelength channels, e.g. centered at $\lambda_2$ and $\lambda_3$, or the remaining portion of each wavelength channel, through the slab waveguide 13. The first reflected optical signal is refocused by the first filter element 14 (or some other means with optical power) at a first output port 16 into a first output waveguide, e.g. fiber, 17.

Preferably, the input optical signal that passed through the first filter 14 encounters additional filter elements, e.g. a second filter element 18, which comprises a second planar filter, such as a second distributed Bragg reflector. The second filter element 18 reflects a portion of the input optical signal, e.g. in a second different range of wavelengths than the first filter element 14, such as a different desired passband with one or more different wavelength channels, e.g. centered at $\lambda_2$, forming a second reflected optical signal. The second reflected optical signal is refocused by the second filter element 18 (or some other means with optical power) at a second output port 19 into a second output waveguide, e.g. fiber, 21. Preferably, the first and second filter elements 14 and 18 each comprise a concave distributed Bragg reflector, such as the ones disclosed in U.S. Pat. No. 6,879,441, issued Apr. 12, 2005 in the name of Mosberg, which is incorporated herein by reference, which filters out and refocuses a desired portion of the input optical signal, eliminating the need for additional lensing elements. One, two, three or more filter elements within the slab waveguide 13 with similar or different passbands for multiplexing or demultiplexing additional channels or bands to or from any of the aforementioned optical signals are also within the scope of this invention.

The first and second filter elements 14 and 18 may be modified to add other features, such as a linear variation in the grating period, called a chirp, to broaden the reflected spectrum. A grating possessing a chirp has the property of adding dispersion; namely, different wavelengths reflected from the grating will be subject to different delays.

The remainder of the input optical signal, e.g. the remaining wavelength channels $\lambda_3$+, which passed through the first and second filter 14 and 18, encounters a third reflective element 22, which is different from the first and second filters 14 and 18, e.g. a planar concave (or arcuate) diffraction grating with optical power, having a diffraction order of 1 or more, or a planar concave (or arcuate) reflective mirror with optical power, i.e. a zero-order diffraction grating. Preferably, the third reflective element 22 is formed, e.g. etched and/or coated, on the end wall of the slab waveguide 13. As a planar concave mirror, the third reflective element 22 reflects and refocuses all of the remaining input optical signal, e.g. the remaining wavelength channels, to a third output port 23 and onto a third output waveguide, e.g. fiber, 24. When the third reflective element 22 is a mirror (reflectivity R=1), the transmission $T_3$ at the third output waveguide 24 can be computed as: $T_3 = 1 - T_1 - T_2$, wherein $T_1$ and $T_2$ are the transmissions at the first and second output waveguides 17 and 21, respectively (See FIG. 4). However, the third reflective element 22 can also be a planar reflective grating, such as the concave diffraction grating disclosed in U.S. Pat. No. 7,151,635 issued Dec. 19, 2006 to the applicants of the present invention, which is incorporated herein by reference, or an Echelle grating. Accordingly, the third reflective element 22 can be used to reflect and focus one or more specific wavelength channels with a desired passband from the input optical signal onto the third output port 23, without the need for extra lensing optics, while eliminated unwanted signals and/or noise (see FIG. 5).

The third reflective element 22, being a different form of diffraction filter, may have a response with different strengths and weaknesses than the first and second filters 14 and 18 that can be exploited by the designers when filtering the remaining wavelength channel(s). For the distributed Bragg reflectors 14 and 18, the spectral width of the reflected channel is proportional to the length of the Bragg reflector. For example, if it takes 2 mm worth of Bragg reflector to reflect 10 nm of bandwidth, it would take 20 mm worth of Bragg reflector to reflect a band of 100 nm. Unfortunately, in applications such as diplexers and triplexers that require 100 nm of bandwidth to couple a laser diode channel, the cumulative size of the Bragg reflectors for all three channels would be too large for practical applications. However, the spectral width of the reflected signal from reflective diffraction gratings or mirrors (mirror=zero-diffraction order grating) does not depend on the length of the reflector, i.e. the light does not penetrate the diffraction grating or the mirror-like structures thus the 'length of the reflector' is irrelevant. Now, the combination of distributed Bragg reflectors and diffraction grating reflectors provides an advantage, because for narrow channels, Bragg reflectors can provide a low-loss spectrally flat transmission for narrow channels, e.g. up to 50 nm (ideally 10 to 20 nm); while a mirror structure or low dispersion strength grating provides a much wider spectral response, e.g. greater than 75 nm or more than 5 times that of the first and second filter elements 14 and 18 (ideally approximately 100 nm or between 5 and 10 times wider than the first and second filter elements 14 and 18) for coupling the laser, effectively eliminating 2 cm of chip length, enabling a practical device to be constructed without additional lensing.

Various combinations of filters are possible with the planar lightwave circuit of the present invention illustrated in FIG. 3: 1) each of the three filter elements 14, 18 and 22 reflect a different desired passband for demultiplexing predetermined wavelength channels with desired, e.g. the same or different, channel widths; 2) each of the first and second filter elements 14 and 18 reflect a different desired passband for demultiplexing predetermined wavelength channels with desired, e.g. the same or different, channels widths, while the third reflective element 22 reflects all of the remaining optical signal; 3) one of the first and second filter elements 14 and 18 is a tap filter for tapping a portion of each of the wavelength channels in the input optical signal, while the other reflects a desired passband for demultiplexing a predetermined wavelength channel with a desired channel width, and the third reflective element 22 either reflects all of the remaining optical signal or a desired passband for demultiplexing a predetermined wavelength channel with a desired channel width.

The waveguides 17, 21, and 23 can be optical fibers, planar waveguides in the planar lightwave circuit or removed altogether, whereby fibers or other optical components can be coupled directly to the slab waveguide 13.

Figure 4:
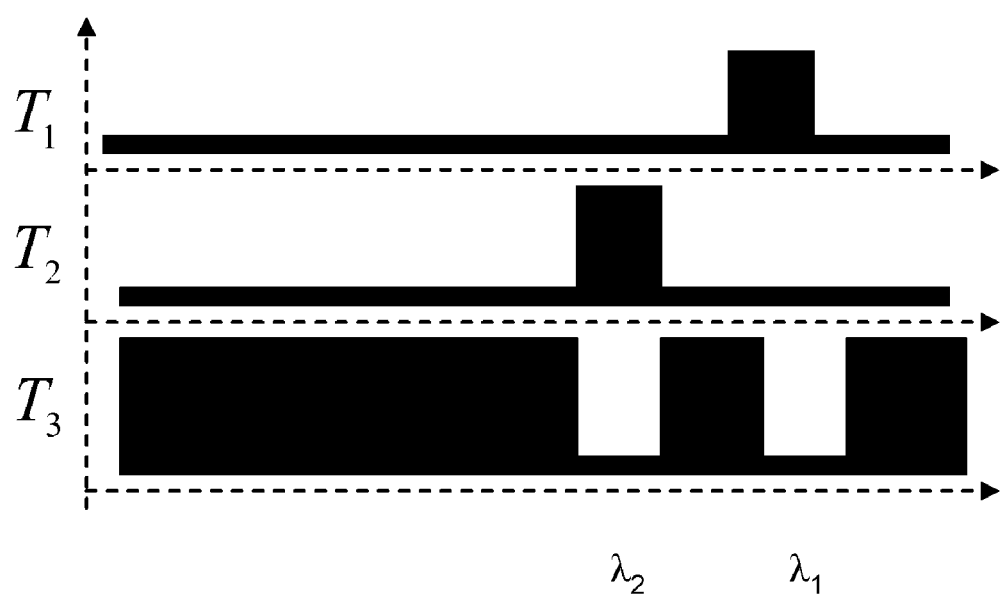
FIG. 4 illustrates one possible set of transmissions to the output ports of the planar lightwave circuit of FIG. 3.

FIG. 4 illustrates transmission plots for the aforementioned Example 2) of the performance of the planar lightwave circuit 10 when the third reflective element 22 is a concave mirror, e.g. zero order diffraction grating. The first filter element 14 ensures that wavelengths in a certain range (transmission $T_1$), e.g. a wavelength channel with center wavelength $\lambda_1$, exit through the first output port 16, whereas the second filter 18 ensures that a different wavelength range (transmission $T_2$), e.g. a wavelength channel with center wavelength $\lambda_2$, exits through the second output port 19. The remainder of the input optical signal (transmission $T_3$) is refocused onto the third output port 23.

Figure 5:
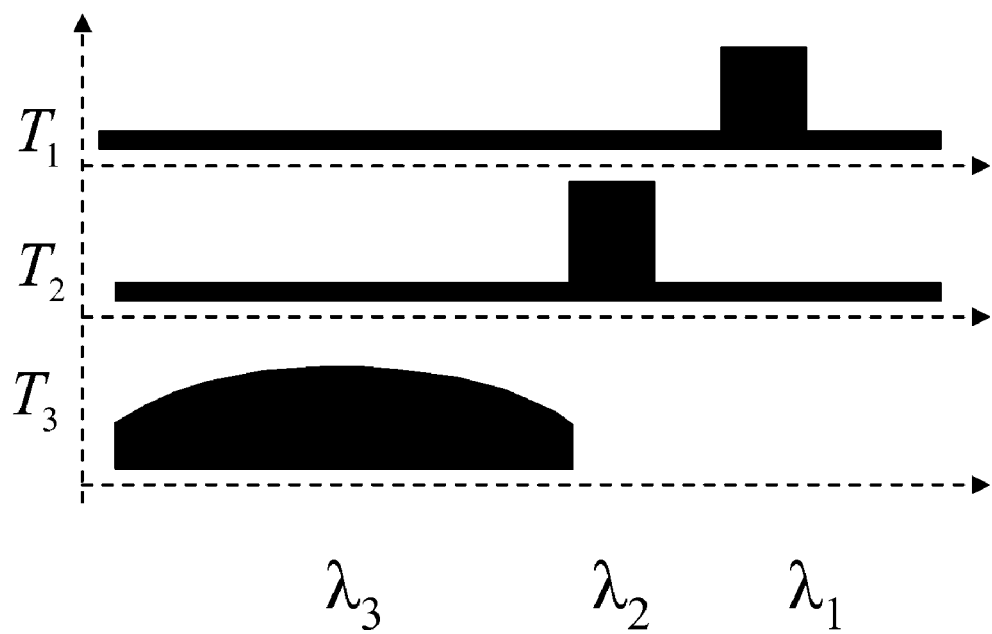
FIG. 5 illustrates another possible set of transmissions to the output ports of the planar lightwave circuit of FIG. 3.

Transmission plots of the aforementioned Example 1), i.e. when the third reflective element 22 is a planar reflective grating (diffraction order of 1 or more), is illustrated in FIG. 5. The first and second filter elements 14 and 18 provide similar performances, i.e. transmissions $T_1$ and $T_2$, to the ones shown in FIG. 4; however, the performance, i.e. transmission $T_3$, of the third reflective element 22 is dictated by the diffraction properties of the grating 22 thereof. In the illustrated example, the passband of the third reflective element 22 is approximately five times the width of the first and second filters 14 and 18, and centered around $\lambda_3$. The remaining light is spilled off. The transmission plots in FIG. 5 can illustrate the demultiplexed channels from FIG. 3 or alternatively represent the incoming channels multiplexed with reference to FIG. 6. Furthermore, transmissions $T_1$ and $T_2$ can represent the incoming demultiplexed channels from FIG. 9, while $T_3$ represents the multiplexed output laser channel.

Figure 6:
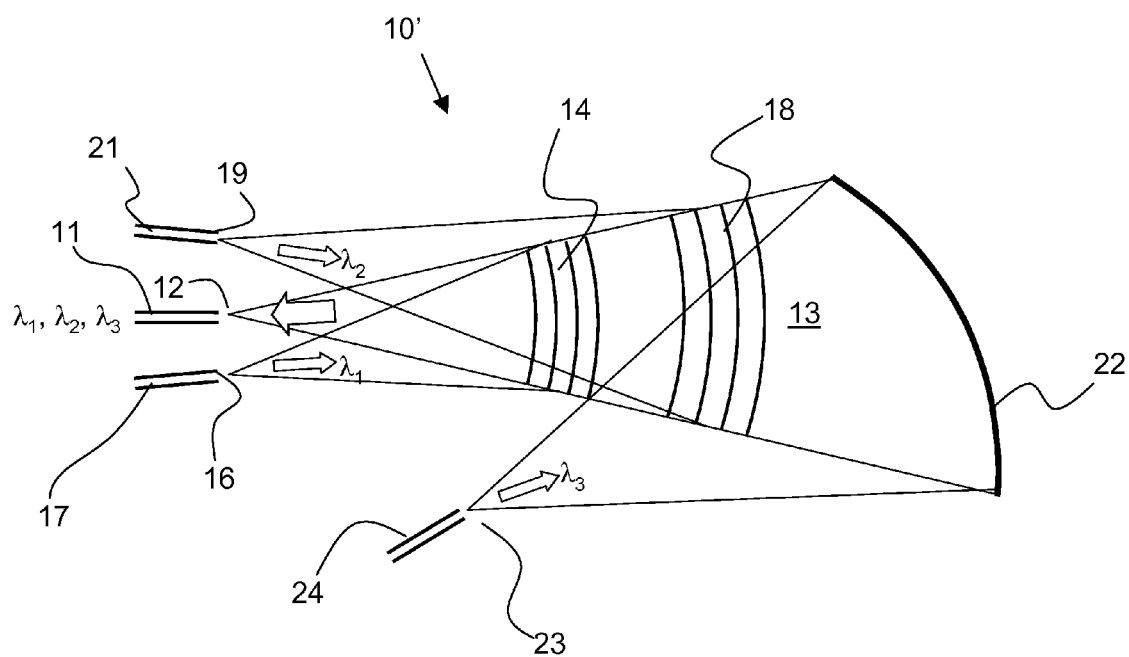
FIG. 6 illustrates a planar lightwave circuit according to the present invention for multiplexing optical signals.

The planar lightwave circuit according to FIG. 3 can also work in reverse, i.e. as a multiplexer 10' illustrated in FIG. 6, wherein the first, second and third filter elements 14, 18 and 22 in the slab waveguide 13 multiplex input optical signals, e.g. with wavelength centers $\lambda_1$, $\lambda_2$ and $\lambda_3$, launched from the output ports 16, 19 and 23, respectively, into a single output optical beam for output the input port 12. As above, various spectral characteristics, e.g. bandwidth and roll-off, can be provided for the different channels utilizing the different types of diffraction filters.

Figure 7:
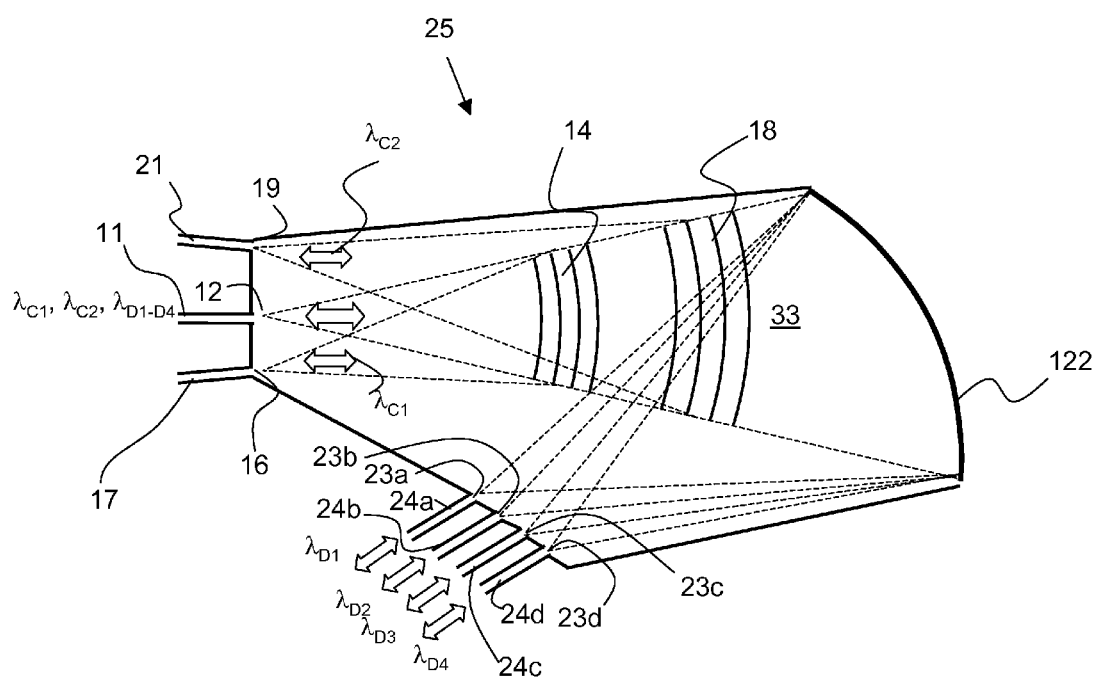
FIG. 7 illustrates a planar lightwave circuit according to the present invention for demultiplexing two sets of optical signals with different channel spacing.

Another embodiment of a multiplexer/demultiplexer (MUX/DEMUX) 25 according to the present invention, illustrated in FIG. 7, includes the input port 12 for launching (or outputting) an optical signal having a plurality of wavelength channels into a slab waveguide 33. The optical signal includes a first set of wavelength channels with a first channel spacing, e.g. coarse wavelength division multiplexed (CWDM) channels ($\lambda_{C1}$ and $\lambda_{C2}$) with a channel spacing of 20 nm, and a second set of wavelength channels, e.g. dense wavelength division multiplexed channels $\lambda_{D1}$ to $\lambda_{D4}$, with a channel spacing, e.g. 0.4, that is different than the first set. Potentially the channel spacing of the second set of channels can be at least one half the channel spacing, one tenth the channel spacing, or even one fiftieth the channel spacing of the first set. Alternatively, the second set of wavelength channels can have the larger channel spacing, e.g. at least two times, five times or ten times the channel spacing of the first set of wavelength channels. The first and second filter elements 14 and 18 enable the wavelength channels, e.g. $\lambda_{C1}$ and $\lambda_{C2}$, from the first set of wavelength channels to be demultiplexed (or multiplexed) and redirected to the output ports 16 and 19, respectively, for output the output waveguides 17 and 21. A concave diffraction grating 122 with optical power, as disclosed in U.S. Pat. No. 7,151,635, disperses and focuses the second set of wavelength channels with the different channel spacing onto respective output ports 23a to 23d for output via waveguides 24a to 24d, respectively. As mentioned above the MUX/DEMUX 25 can also multiplex channels launched from the ports 16, 19 and 23a to 23d for output the input port 12. Alternatively, the MUX/DEMUX 25 can provide bidirectional filtering, e.g. the first and second filters 14 and 18 can demultiplex a set of incoming wavelength channels for output the output ports 16 and 19, while the concave diffraction grating 122 multiplexes a set of outgoing wavelength channels input the output ports 23a to 23d for output the input port 12 or vice versa.

A variety of different configurations can be implemented for any number of input and output wavelength channels or for implementations in which the first and second filter elements 14 and 18 redirect selected wavelength channels to any one or more of the input port 12, the first output port 16, and the second output port 19, i.e. one or more wavelength channels from an input optical signal input via one of the output ports 16, 19 and/or 24a to 24d is combined with one or more of the wavelength channels input via the input port 12, and then output one of the other output ports 16, 19 and/or 24a to 24d.

Figure 8:
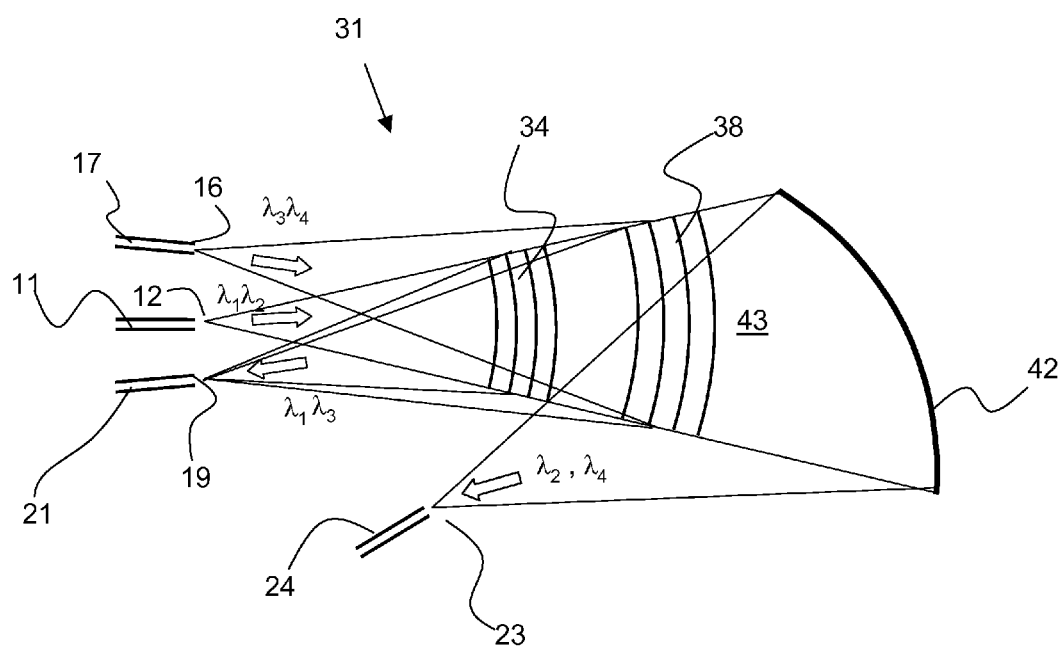
FIG. 8 illustrates a planar lightwave circuit according to the present invention for demultiplexing and multiplexing optical signals.

For example: the functionality of a cross-connect 31 can be achieved when a portion, e.g. a wavelength channel centered at $\lambda_1$, of a first input optical signal, including $\lambda_1$ and $\lambda_2$, launched via the input port 12 into the slab waveguide 43 is redirected and refocused by a first distributed Bragg reflector filter 34 onto the second output port 19, while a portion, e.g. a wavelength channel $\lambda_3$, of a second input optical signal, including $\lambda_3$ and $\lambda_4$, launched via the port 16 is reflected and refocused by a second distributed Bragg reflector filter 38 onto the second output port 19. The remainders of the first and second input optical signals, including $\lambda_2$ and $\lambda_4$, pass through to a third reflective element 42, in the form of a diffraction grating, and all or portions thereof are multiplexed and redirected to the third output port 23, as illustrated in FIG. 8.

Figure 9:
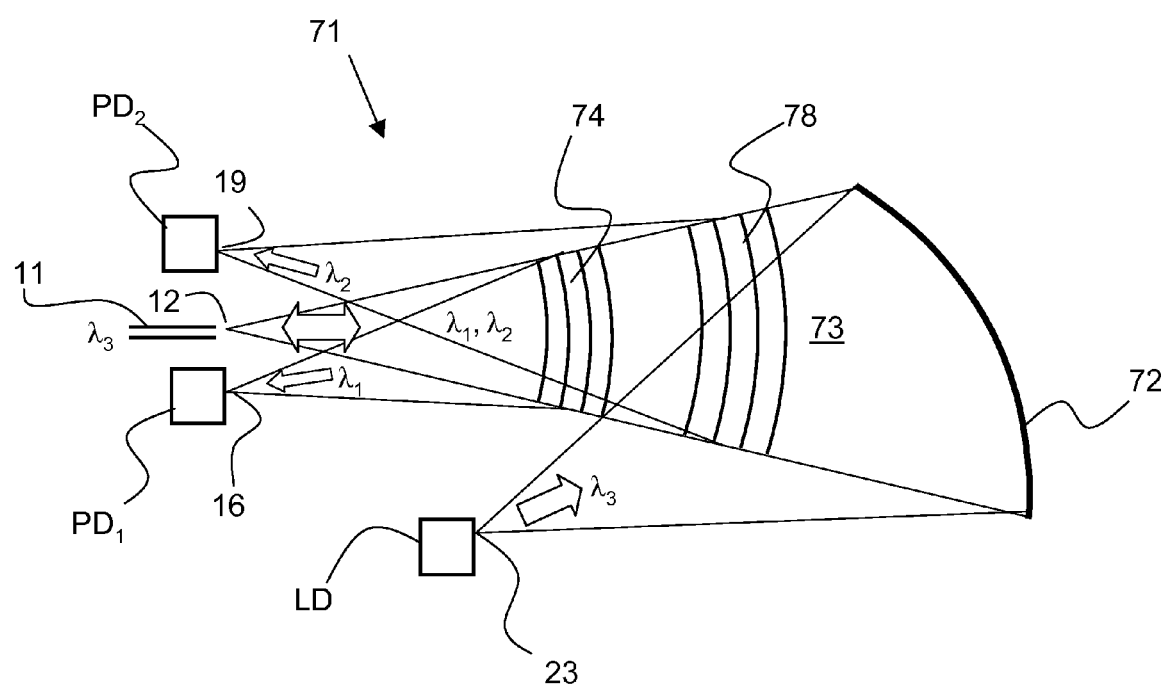
FIG. 9 illustrates a planar lightwave circuit according to the present invention providing bidirectional triplexer functionality.

Another application for the planar lightwave circuit according to the present invention, illustrated in FIG. 9, is a triplexer 71 for the access telecommunication market. First and second wavelength filters 74 and 78, e.g. in the form of concave distributed Bragg reflectors described above, formed in a slab waveguide 73, demultiplex first and second wavelength channels, respectively, e.g. at 1550 nm and 1490 nm wavelengths for analog video and data channels, from an input optical signal launched via the input port 12 from the input waveguide 11. The first and second filters 74 and 78 have a narrow passband providing wavelength channels from 10 nm to 20 nm in width. The first and second wavelength channels are converted into electrical signals by photodetectors $PD_1$ and $PD_2$, respectively, optically coupled to the first and second output ports 16 and 19, respectively. A third reflective element 72, preferably in the form of the concave diffraction grating (diffraction order 1 or more) described above, multiplexes a signal from a laser LD, e.g. at approximately 1310 nm, launched via the port 23 with an outgoing signal into the input waveguide 11 via the input port 12. Due to manufacturing variations and temperature drifts, lasers require a broad multiplexing band, e.g. 50 nm to 100 nm (at least 5 times wider than the first and second filters 74 and 78), which is provided by the third filter 72. The designed passband of the third filter also prevents unwanted wavelengths traveling from the other ports 12, 16 and 19 from entering the third port 23. The waveguides 17, 21, and 23 can be optical fibers, planar waveguides in the planar lightwave circuit or removed altogether, whereby the fiber 10, the $PD_1$, the $PD_2$ and the LD are coupled directly to the slab waveguide 73. Furthermore, the order and position of the output ports and the waveguides 12, 16, 19, and 23 are not material and FIG. 9 just gives one possible combination.

Figure 10:
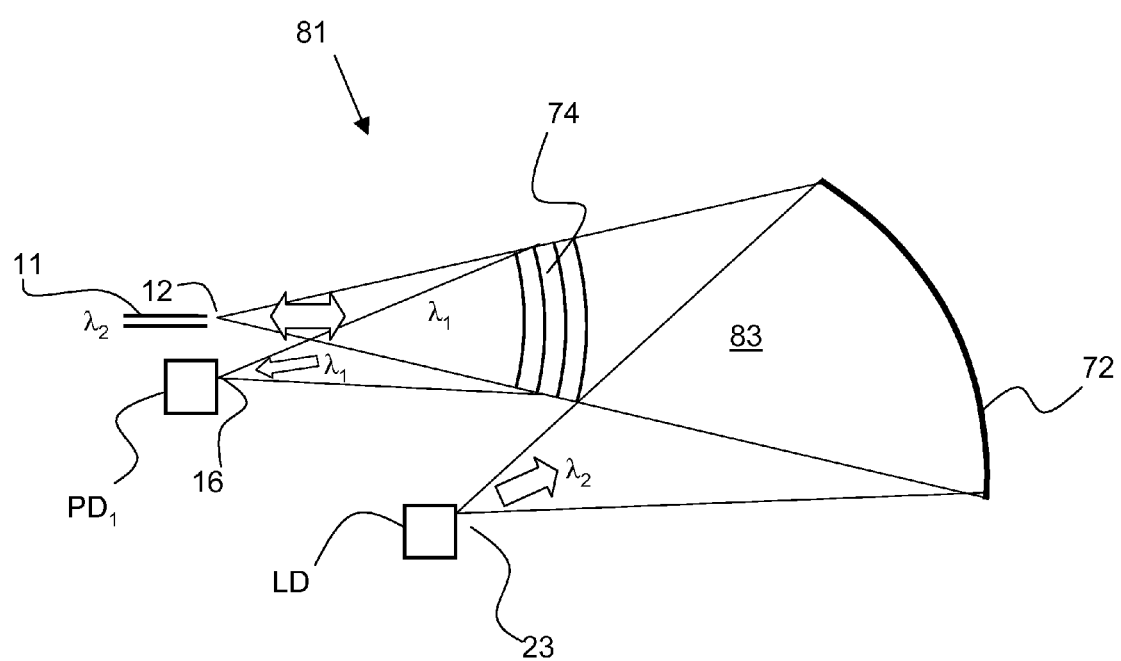
FIG. 10 illustrates a planar lightwave circuit according to the present invention providing bi-directional diplexer functionality.

With reference to FIG. 10, a diplexer device 81 can be constructed using the same platform as the triplexer 71 by omitting the second filter 78, the second output port 19, the second output waveguide 21, and the second photo-detector $PD_2$. The remaining elements are the same as the triplexer, whereby a single channel $\lambda_1$, e.g. 10 nm to 20 nm in width, is input a slab waveguide 83 via the input port 12 for separation by the first filter 74, and conversion by the first photo-detector $PD_1$, and a single channel $\lambda_2$ is launched by the laser LD via the port 23 and multiplexed onto the fiber 11 via the input port 12 utilizing the concave diffraction grating 72.

Figure 11:
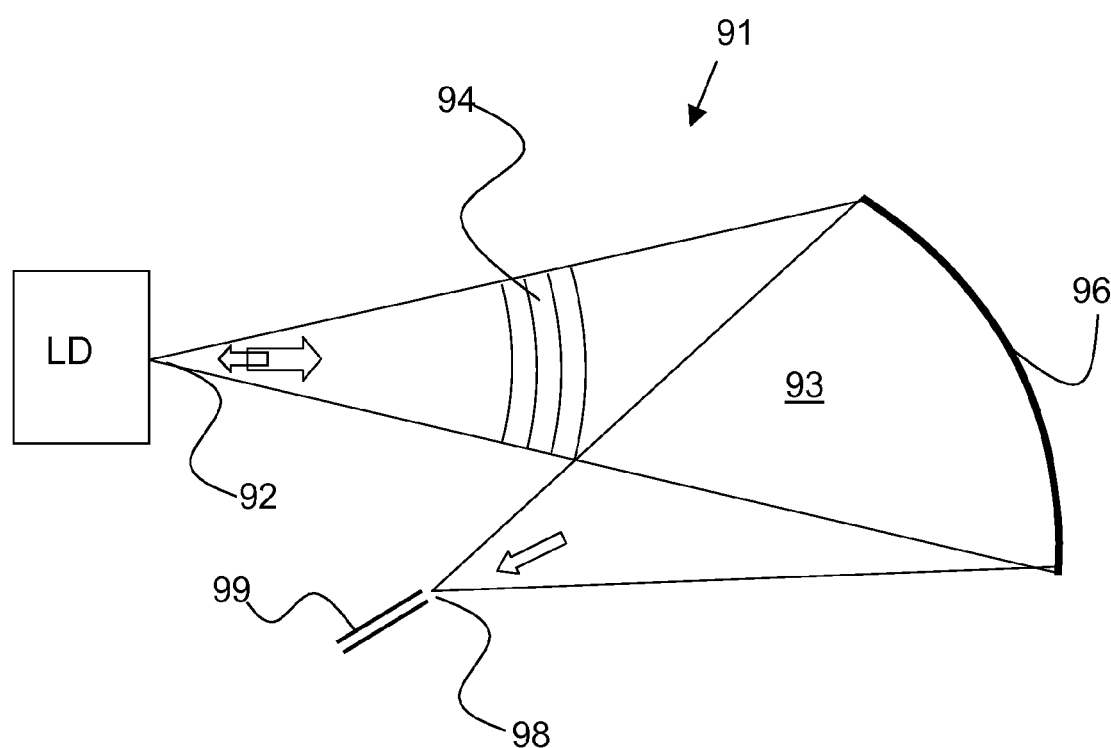
FIG. 11 illustrates a planar lightwave circuit according to the present invention providing wavelength locking functionality to a laser.

Another embodiment, illustrated in FIG. 11, utilizes a planar lightwave circuit 91 according to the present invention as a wavelength locker for a laser diode LD. A slab waveguide 93 includes a first filter 94, e.g. a distributed Bragg reflector, as defined above with reference to the first filter 14, reflects a portion of the light emitted from the laser diode LD via a first port 92 back into the laser diode LD, via the first port 92, i.e. the first and second ports are in the same location, to lock the wavelength of the laser diode. A concave reflective element 96, e.g. a concave planar diffraction grating or a concave mirror, refocuses the remainder of the light emitted from the laser diode LD to an output port 98 and onto an output waveguide, e.g. fiber 99. The diffraction grating 96 can be used to filter out unwanted wavelengths, e.g. eliminate spontaneous emissions from the laser diode. Accordingly a single planar waveguide chip can provide feedback to the laser, and focus the remaining light onto an output port. In addition, the same planar waveguide chip can provide additional filtering for the elimination of noise in the output signal.

We claim:

1. A planar lightwave circuit device comprising:
a slab waveguide including a core region;
a first port for launching a first input optical signal into the slab waveguide;
a second port optically coupled with the first port for outputting at least a first portion of the input optical signal from the slab waveguide;
a third port optically coupled to the first port;
a first planar filter formed in the slab waveguide for redirecting the first portion of the input optical signal to the second port; and
a concave reflective element having optical power formed in an end wall of the slab waveguide optically coupling the first port to the third port and enabling light to be focused therebetween
wherein the first filter comprises a concave distributed Bragg reflector for redirecting and refocusing the first portion of the first input optical signal to the second port; and
wherein the reflective element comprises a concave diffraction grating formed in the end wall of the slab waveguide for filtering and refocusing at least one wavelength channel between the first and third ports.

2. The device according to claim 1, wherein the diffraction grating separates and refocuses at least one wavelength channel from the first input optical signal onto the third port.

3. The device according to claim 1, wherein the diffraction grating multiplexes a wavelength channel from a second optical signal launched from the third port onto the first port.

4. The device according to claim 1, wherein the diffraction grating has a spectral response at least five times wider than that of the first filter.

5. The device according to claim 1, further comprising: a fourth port optically coupled with the first port; and a second planar filter formed in the slab waveguide region optically coupling the first port with the fourth port.

6. The device according to claim 5, wherein the first input optical signal includes a plurality of wavelength channels; wherein the first portion comprises a first wavelength channel, which the first filter demultiplexes; wherein the concave reflective element redirects a second wavelength channel from the first input optical signal to the third port; and wherein the second filter demultiplexes a third wavelength channel from the first input optical signal and redirects the third wavelength channel to the fourth port.

7. The device according to claim 6, further comprising a fifth port optically coupled to the first port; wherein the concave reflective element comprises a concave diffraction grating, which also demultiplexes and focuses a fourth wavelength channel from the first input optical signal to the fifth port.

8. The device according to claim 7, wherein the first and second filters demultiplex channels with a first channel spacing; and wherein the concave diffraction grating demultiplexes channels with a second channel spacing different than the first channel spacing.

9. The device according to claim 5, wherein the first input optical signal includes a plurality of wavelength channels; wherein the first portion comprises a portion of each of the wavelength channels, which the first filter directs to the second port; wherein the reflective element redirects a second wavelength channel to the third port; and wherein the second filter demultiplexes a third wavelength channel from the first input optical signal and redirects the third wavelength channel to the fourth port.

10. The device according to claim 5, wherein the first input optical signal includes a plurality of wavelength channels; wherein the first portion comprises a first wavelength channel, which the first filter redirects to the second port, while passing a second wavelength channel;

wherein the second filter redirects a third wavelength channel launched via the fourth port to the second port, while passing a fourth wavelength channel; and wherein the reflective element redirects and focuses the second and fourth wavelength channels onto the third port.

11. The device according to claim 5, wherein the input optical signal includes a plurality of wavelength channels; wherein the first portion comprises a first wavelength channel, which the first filter demultiplexes; wherein the second filter demultiplexes and redirects a second wavelength channel from the first input optical signal to the fourth port; and wherein the reflective element multiplexes a third wavelength channel launched in a second input optical signal via the third port onto the first port.

12. The device according to claim 11, further comprising: a first photo-detector optically coupled to the second port for converting the first wavelength channel to a first electrical signal; a second photo-detector optically coupled to the fourth port for converting the second wavelength channel to a second electrical signal; and a laser optically coupled to the third port for generating an optical signal comprising the third wavelength channel.

13. The device according to claim 12, wherein the first and second filters each comprise a concave distributed Bragg reflector for redirecting and refocusing the first and second wavelength channels to the second and fourth ports, respectively; and wherein the reflective element comprises a diffraction grating formed in the end wall of the slab waveguide for refocusing the third wavelength channel, with a desired channel width at least five times wider than the first and second channels, from the third port onto the first port.

14. The device according to claim 1, further comprising a laser optically coupled to the first port; wherein the second port is in the same location as the first port, whereby the first planar filter redirects and refocuses a first portion of the input optical signal back to the laser for locking the wavelength thereof at a desired wavelength, and passes a remainder of the input optical signal to the concave reflective element; and wherein the concave reflective element focuses the remainder of the input optical signal onto the third port.

15. A planar lightwave circuit device comprising:
a slab waveguide including a core region;
first port for launching an input optical signal into the slab waveguide;
a second port for outputting a first portion of the input optical signal;
a first concave distributed Bragg reflector filter formed in the slab waveguide for redirecting and refocusing the first portion of the input optical signal onto the second port, and for passing a second portion of the input optical signal;
a third port for outputting the second portion of the input optical signal; and
a concave diffraction grating, having an order of zero or higher, formed in an endwall of the slab waveguide for focusing light between the first and third ports.

16. The device according to claim 15, further comprising: a fourth port; and a second concave distributed Bragg reflector filter for optically coupling the first port with the fourth port.

17. The device according to claim 16, further comprising a laser optically coupled to the fourth port for launching an output signal at the concave diffraction grating for output the first port.

18. A wavelength locker comprising:
a slab waveguide included a core region;
a first port for optically coupling to a laser, which launches an input optical signal into the slab waveguide;
a first concave distributed Bragg reflector filter formed in the slab waveguide for redirecting and refocusing a first portion of the input optical signal back to the first port for locking the wavelength thereof at a desired wavelength, and for passing a remainder of the input optical signal;
a second port optically coupled with the first port for outputting the remainder of the input optical signal from the slab waveguide; and
a concave reflective element formed in an end wall of the slab waveguide optically coupling the first port to the third port for redirecting and refocusing the remainder of the input optical signal to the second port;
wherein the reflective element comprises a concave diffraction grating for filtering out unwanted portions of the remainder of the input optical signal.

* * * * *